(12) United States Patent
Goering

(10) Patent No.: US 7,964,520 B2
(45) Date of Patent: Jun. 21, 2011

(54) METHOD FOR WEAVING SUBSTRATES WITH INTEGRAL SIDEWALLS

(75) Inventor: Jonathan Goering, York, ME (US)

(73) Assignee: Albany Engineered Composites, Inc., Rochester, NH (US)

( * ) Notice: Subject to any disclaimer, the term of this patent is extended or adjusted under 35 U.S.C. 154(b) by 655 days.

(21) Appl. No.: 11/963,179

(22) Filed: Dec. 21, 2007

(65) Prior Publication Data
US 2009/0163100 A1    Jun. 25, 2009

(51) Int. Cl.
*D03D 11/00* (2006.01)
*B32B 5/26* (2006.01)

(52) U.S. Cl. ...... 442/205; 442/203; 442/246; 139/384 R

(58) Field of Classification Search .................. 442/203, 442/204, 205, 246, 251, 253, 254; 139/11, 139/DIG. 1, 384 R, 408, 414
See application file for complete search history.

(56) References Cited

U.S. PATENT DOCUMENTS

| | | | |
|---|---|---|---|
| 4,256,790 A | 3/1981 | Lackman et al. |
| 4,331,495 A | 5/1982 | Lackman et al. |
| 4,788,101 A | 11/1988 | Sakatani et al. |
| 4,922,968 A | 5/1990 | Bottger et al. |
| 4,958,663 A | 9/1990 | Miller et al. |
| 5,085,252 A | 2/1992 | Mohamed et al. |
| 5,121,530 A | 6/1992 | Sakatani et al. |
| 5,126,190 A | 6/1992 | Sakatani et al. |
| 5,236,020 A | 8/1993 | Sakatani et al. |
| 5,343,897 A | 9/1994 | Sakatani et al. |
| 5,348,056 A | 9/1994 | Tsuzuki |
| 5,429,853 A | 7/1995 | Darrieux |
| 5,772,821 A | 6/1998 | Yasui et al. |
| 5,783,279 A | 7/1998 | Edgson et al. |
| 5,785,094 A | 7/1998 | Yoshida |
| 5,899,241 A | 5/1999 | David et al. |
| 6,010,652 A | 1/2000 | Yoshida |
| 6,019,138 A | 2/2000 | Malek et al. |
| 6,103,337 A | 8/2000 | Burgess |
| 6,283,168 B1 | 9/2001 | Gu et al. |
| 6,418,973 B1 | 7/2002 | Cox et al. |
| 6,446,675 B1 | 9/2002 | Goering |
| 6,502,788 B2 | 1/2003 | Noda et al. |

(Continued)

OTHER PUBLICATIONS

International Search Report issued by European Patent Office for corresponding international application PCT/US2008/086973 mailed Mar. 24, 2009.

*Primary Examiner* — Cheryl Juska
(74) *Attorney, Agent, or Firm* — Frommer Lawrence & Haug LLP; Ronald R. Santucci

(57) ABSTRACT

The present invention generally relates to an integrally woven three-dimensional preform with at least one sidewall in at least one direction constructed from a woven base fabric comprising two or more layers, and a method of forming thereof. A plurality of fibers in a first direction is interwoven between at least the top layer and a second layer, such that top layer is foldable relative to the other layers and form, upon folding, an integral sidewall. A plurality of fibers may also be interwoven between the second-from-the-top layer and a second layer, such that the second-from-the-top layer is foldable relative to the other layers, upon folding, form a second integral sidewall perpendicular to the first integral sidewall. The preform may optionally comprise a plurality of non-integral sidewalls formed by folding portions of the topmost layer.

26 Claims, 22 Drawing Sheets

U.S. PATENT DOCUMENTS

| | | |
|---|---|---|
| 6,702,911 B2 | 3/2004 | Toi et al. |
| 6,712,099 B2 | 3/2004 | Schmidt et al. |
| 6,733,211 B1 | 5/2004 | Durie |
| 6,733,862 B2 | 5/2004 | Goering |
| 6,835,341 B2 | 12/2004 | Noda et al. |
| 6,874,543 B2 | 4/2005 | Schmidt et al. |
| 6,899,941 B2 | 5/2005 | Goering et al. |
| 7,074,474 B2 | 7/2006 | Toi et al. |
| 7,413,999 B2 * | 8/2008 | Goering ................. 442/181 |
| 7,655,581 B2 * | 2/2010 | Goering ................. 442/205 |
| 7,712,488 B2 * | 5/2010 | Goering et al. ......... 139/384 R |
| 7,713,893 B2 * | 5/2010 | Goering ................. 442/246 |
| 2002/0192450 A1 | 12/2002 | Schmidt et al. |
| 2003/0056847 A1 | 3/2003 | Schmidt et al. |
| 2006/0121809 A1 | 6/2006 | Goering |
| 2008/0009210 A1 * | 1/2008 | Goering ................. 442/181 |
| 2009/0149100 A1 * | 6/2009 | Goering ................. 442/203 |
| 2009/0247034 A1 * | 10/2009 | Goering et al. ......... 442/206 |
| 2010/0105260 A1 * | 4/2010 | Rae ...................... 440/38 |
| 2010/0105268 A1 * | 4/2010 | Ouellette et al. ....... 442/203 |
| 2010/0105269 A1 * | 4/2010 | Goering et al. ......... 442/205 |
| 2010/0167007 A1 * | 7/2010 | Goering ................. 428/124 |
| 2010/0167616 A1 * | 7/2010 | Goering ................. 442/205 |

* cited by examiner

METHOD FOR WEAVING SUBSTRATES WITH INTEGRAL SIDEWALLS

INCORPORATION BY REFERENCE

This application is related to U.S. patent application Ser. No. 11/007,600 filed on Dec. 8, 2004 now U.S. Pat. No. 7,713,893 issued to May 11, 2010, which is herein incorporated by reference.

All patents, patent applications, documents and/or references referred to herein are incorporated by reference, and may be employed in the practice of the invention.

FIELD OF THE INVENTION

The present invention relates to integrally woven preforms for reinforced composite structures which can be woven flat and folded into their final three-dimensional shape, the final shape having integral sidewalls in at least one direction.

BACKGROUND OF THE INVENTION

The use of reinforced composite materials to produce structural components is now widespread, particularly in applications where their desirable characteristics for being lightweight, strong, tough, thermally resistant, self-supporting and their adaptability to being formed and shaped are sought. Such components are used, for example, in the aeronautical, aerospace, and satellite industries, as well as for recreational uses such as in racing boats and countless other applications. Typically components consist of reinforcement materials embedded in matrix materials. The reinforcement component may be made from materials such as glass, carbon, ceramic, aramid, polyethylene, and/or other materials which exhibit desired physical, thermal, chemical and/or other properties, chief among which is great strength against stress failure. Through the use of such reinforcement materials, which ultimately become a constituent element of the completed component, the desired characteristics of the reinforcement materials such as very high strength, are imparted to the completed composite component. The constituent reinforcement materials may typically be woven, knitted or otherwise oriented into desired configurations and shapes for reinforcement preforms. Usually, particular attention is paid to ensure the optimum utilization of the properties for which these constituent reinforcing materials have been selected. Generally, such reinforcement preforms are combined with matrix material to form desired finished components or produce working stock for the ultimate production of finished components.

After a desired reinforcement preform has been constructed, matrix material may be introduced and combined with the preform, so that the reinforcement preform becomes encased in the matrix material such that the matrix material fills the interstitial areas between the constituent elements of the reinforcement preform. The matrix material may be any of a wide variety of materials, such as epoxy, polyester, vinylester, ceramic, carbon and/or other materials, which also exhibit desired physical, thermal, chemical and/or other properties. The materials chosen for use as the matrix may or may not be the same as that of the reinforcement preform and may or may not have comparable physical, chemical thermal or other properties. Typically, however, they will not be of the same materials or have comparable physical, chemical, thermal or other properties, as the reinforcement preform, since a usual objective sought in using composites in the first place is to achieve a combination of characteristics in the finished product that is not attainable through the use of one constituent material alone. When combined, the reinforcement preform and the matrix material may then be cured and stabilized in the same operation by thermosetting or other known methods, and then subjected to other operations toward producing the desired component. It is significant to note that after being so cured, the then solidified masses of the matrix material are normally very strongly adhered to the reinforcing material (e.g., the reinforcement preform). As a result, stress on the finished component, particularly via its matrix material acting as an adhesive between fibers, may be effectively transferred to and borne by the constituent material of the reinforcing reinforcement preform.

Frequently, it is desirable to produce components in configurations other than simple geometric shapes such as plates, sheets, rectangular or square solids, etc. Of particular interest is the configuration consisting of a flat substrate with integral sidewalls in two directions. The integral sidewalls can be used as conventional stiffeners in stiffened skin applications, wherein the substrate acts as the skin. In each of these applications, it is important to make each juncture between the constituent components, i.e. the stiffener and the base platform or panel portion, as strong as possible. Given the desired very high strength of the reinforcement preform constituents per se, weakness of the juncture becomes, effectively, a "weak link" in a structural "chain."

Various methods have been used in the past for joining composite components or reinforcement preforms to produce a reinforced complex structure or stiffened skin panels. It has been proposed to use individual layers of tackified fabric or prepreg to form the structure of the substrate with sidewalls. When tackified fabric is used, the resulting laminated preform can thereafter be resin transfer molded; if prepreg is used to form the final shape, the resulting preform can be vacuum bagged and cured. However, application of loads, in particular through thickness loads, to the laminated preform can result in delamination of the preform or separation of the sidewalls from the flat substrate.

The use of metal bolts or rivets at the interface of such components has also been used but is unacceptable because such additions at least partially destroy and weaken the integrity of composite structures themselves, add weight, and introduce differences in the coefficient of thermal expansion between such elements and the surrounding material.

Other approaches to solving this problem have been based on the concept of introducing high strength fibers across the joint area through the use of such methods as stitching one of the components to the other and relying upon the stitching thread to introduce such strengthening fibers into and across the juncture site. One such approach is shown in U.S. Pat. No. 4,331,495 and its method divisional counterpart, U.S. Pat. No. 4,256,790. These patents disclose junctures having been made between a first and second composite panel made from adhesively bonded fiber plies. The first panel is bifurcated at one end to form two divergent, co-planar panel contact surfaces in the prior art manner, that have been joined to the second panel by stitches of uncured flexible composite thread through both panels. The panels and thread are then "co-cured": i.e., cured simultaneously. However, this process requires the preform to be constructed in multiple steps, as well as requires the introduction of a third yarn or fiber into the preform.

An example of an intersecting configuration is set forth in U.S. Pat. No. 6,103,337, the disclosure of which is incorporated herein by reference. This reference discloses a means for joining a reinforcement preform with a preform panel to form a three-dimensional reinforcement preform. The two individual preforms are joined to each other at the junction by means of reinforcing fibers in the form of threads or yarns. Once the two preforms are joined or stitched together, matrix material is introduced to the preforms. However, this process requires that the preforms be individually woven or constructed and subsequently stitched together in a separate step. The preforms are not continuously or integrally woven together. Furthermore, an additional yarn or fiber is needed to connect the preforms.

Another method to improve upon junction strength is set forth in U.S. Pat. No. 5,429,853. However, this method is similar to previously described methods because separately constructed distinct elements are joined together by the stitching of a third yarn or fiber between the two.

While the prior art has sought to improve upon the structural integrity of the reinforced composite and has achieved some success, there exists a desire to improve thereon and to address the problem through an approach different from the use of adhesives or mechanical coupling of the separate panel and stiffener elements. In this regard, one approach might be by creating a woven three-dimensional structure on specialized machines. A three-dimensional fabric generally consists of fibers extending along a direction perpendicular to the other fibers, which is along the X, Y and Z axial directions. However, the expense involved is considerable and rarely is it desirable to have a weaving machine directed to creating a single type of structure.

Another approach is to weave a two-dimensional structure and fold it into shape so that the panel is integrally stiffened, i.e. yarns are continuously interwoven between the planar base or panel portion and the stiffener. However, this typically results in distortion of the preform when the preform is folded. The distortion occurs because the lengths of fiber as-woven are different than what they should be when the preform is folded. This causes dimples and ripples in areas where the as-woven fiber lengths are too short, and buckles in the areas where fiber lengths are too long. These distortions cause undesirable surface anomalies and reduce the strength and stiffness of the component. While this may be relieved by cutting and darting, such procedures are undesirable since they are labor intensive or otherwise may compromise the integrity of the preform.

U.S. Pat. No. 6,446,675, the disclosure of which is incorporated herein by reference, solves the problem with distortion that occurs upon folding a two-dimensional woven preform by adjusting the lengths of the fibers during weaving such that some fibers are too short in some areas and others too long in other areas. Upon folding the preform, the lengths of the fibers are equalized, providing for a smooth transition at the fold. However, this woven preform is only capable of providing reinforcement or stiffening in one direction, which is parallel to the warp fiber direction.

Another approach for constructing stiffened panels is set forth in U.S. Pat. No. 6,019,138 which discloses a method for making stiffened panels with reinforcing stiffeners in both the warp and fill directions. As disclosed, this method achieves reinforcement in two directions through over weaving, or simply weaving high spots into the panel portion of the preform. Using this method will limit the height of the stiffener that can be achieved. Further, this method requires that the preform be woven using three yarns. The third yarn, which binds the stiffener to the panel portion of the preform, is only periodically woven between the other two yarns. Therefore, the stiffener is not completely integrally woven with the panel portion which results in a joint that is weaker than a fully integrally woven joint.

Accordingly, a need exists for an integrally woven preform that provides sidewalls in two or more directions that can be woven in one process using a conventional loom without any special modifications.

Citation or identification of any document in this application is not an admission that such document is available as prior art to the present invention.

SUMMARY OF THE INVENTION

In accordance with the present invention, an integrally woven three-dimensional preform with sidewalls, or at least one sidewall, in at least one direction is provided. The preform may comprise at least two layers of woven fabric, wherein each layer is comprised of fibers in the weft and warp directions. The fibers of one layer can be interwoven with fibers of another layer to form an interwoven region.

Sidewalls are formed by cutting a portion of the topmost layer and then folding the portion upward such that it is perpendicular, or transverse, to the preform, thereby creating a wall. When the fold occurs at an interwoven region wherein the topmost layer is interwoven with another layer, the sidewall is considered to be an integral sidewall, as it is integrated with a lower layer of the preform, i.e., the fibers of a lower layer weave into the sidewalls. When the fold does not occur at a site where layers are interwoven, then the "non-integral" sidewall is not integrated into the preform and can be moved to other locations, if desired. The sidewall can comprise one or more layers of fabric.

Fibers in one direction, e.g., weft, fibers may interweave between different layers than fibers in the other direction, e.g., warp. For example, in a three layer preform, fibers in the weft direction of the first layer may be interwoven with fibers in the warp direction of the third layer, while fibers in the warp direction of the second layer may be interwoven with fibers in the weft direction of the third layer. This allows for integral sidewalls to form which are perpendicular to each other. In one embodiment, integral sidewalls in one direction, e.g., warp, will be continuous, while sidewalls in a perpendicular direction, e.g., weft, will be discontinuous.

The sidewalls can be oriented such that they enclose, or border, small areas of the preform referred to as cells. These cells can vary in shape and size, which are determined by where the integral sidewalls of the preform are formed, and/or where the non-integral sidewalls are oriented. Examples of cell shapes include polygons such as squares, rectangles, hexagons, etc. Moreover, the cells in a preform may be of more than one cell shape, such as a combination of squares and rectangles.

In a preferred embodiment, the preform may comprise cells that are rectangular in shape. This type of preform may comprise at least three layers of woven fabric, wherein each layer is comprised of fibers in the weft and warp directions. In the weft direction, fibers of the first layer may be interwoven with fibers of the third layer, while in the warp direction, fibers of the second sheet may be woven with fibers of the third layer at selected sites. Alternatively, the interweaving between layers for the weft and warp fibers can be interchanged, wherein the fibers in the warp direction are interwoven between the first and third layers, and the fibers in the weft direction are interwoven between the second and third layers. The interwoven regions mark where the layers may be folded to form the integral sidewalls. The first and third layers and the second and third layers can interweave at more than one interwoven region, i.e., more than one site along the warp or weft direction of the preform. The integral sidewalls formed by the first and third layers and the sidewalls formed by the second and third layers are preferably perpendicular to each other. In a particular embodiment, integral sidewalls in one of the directions, e.g., weft, are continuous, while integral sidewalls in the other direction, e.g., warp, are discontinuous.

In another embodiment, the preform may comprise cells that are hexagonal in shape. This type of preform may comprise at least two layers of woven fabric, wherein each layer is comprised of fibers in the weft and warp directions. In the weft direction, fibers of the first layer may be woven with fibers of the second layer to form interwoven regions at selected sites, while in the warp direction, fibers of the first and second layers do not interweave. The interweaving between layers, or lack thereof, for the weft and warp fibers can be interchanged, wherein the fibers in the warp direction are interwoven between the first and second layers, and the fibers in the weft direction are not interwoven between layers. At the interwoven regions, integral sidewalls are formed in the warp direction and become one pair of opposing sidewalls which form the hexagonal cell. Non-integral sidewalls from the first layer are also formed, which attach to the integral sidewalls at an angle, preferably 60°. The selected sites for interweaving the layers mark where the sheets may be folded to form the integral sidewalls. In addition, non-integral sidewalls from the first layer can be formed, which become the walls that do not extend in the weft or warp directions.

Another aspect of the present invention is a method for forming a woven three-dimensional preform with sidewalls. The method comprises providing two or more layers of woven fabric wherein a plurality of fibers from one layer of fabric are interwoven with a plurality of fibers from another layer of fabric. Interweaving can occur for fibers in both the weft and warp directions, and between multiple pairs of layers. Once the layers are formed, the topmost layer is cut to form separated portions that can be folded upwards to form sidewalls. Optionally, the second layer, now considered as topmost, is then cut to form additional sidewalls. This is repeated until the desired number and orientation of sidewalls are formed. In one particular embodiment, the present invention is a method of forming a three-dimensional preform with one or more integral sidewalls, wherein the sidewalls form cells that are rectangular in shape. In another embodiment, the invention is a method of forming a three-dimensional preform with sidewalls, wherein the sidewalls form cells that are hexagonal in shape.

The various features of novelty which characterize the invention are pointed out in particularity in the claims annexed to and forming a part of this disclosure. For a better understanding of the invention, its operating advantages and specific objects attained by its uses, reference is made to the accompanying descriptive matter in which preferred embodiments of the invention are illustrated in the accompanying drawings in which corresponding components are identified by the same reference numerals.

Accordingly, it is an object of the invention to not encompass within the invention any previously known product, process of making the product, or method of using the product such that Applicants reserve the right and hereby disclose a disclaimer of any previously known product, process, or method. It is further noted that the invention does not intend to encompass within the scope of the invention any product, process, or making of the product or method of using the product, which does not meet the written description and enablement requirements of the USPTO (35 U.S.C. 112, first paragraph) or the EPO (Article 83 of the EPC), such that Applicants reserve the right and hereby disclose a disclaimer of any previously described product, process of making the product, or method of using the product.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

These and other embodiments are disclosed or are obvious from and encompassed by, the following Detailed Description.

BRIEF DESCRIPTION OF THE DRAWINGS

The following detailed description, given by way of example, but not intended to limit the invention solely to the specific embodiments described, may best be understood in conjunction with the accompanying drawings, in which:

FIG. 1A shows through thickness angle interlock architecture. FIG. 1B shows through thickness orthogonal architecture. FIG. 1C shows ply-to-ply interlock architecture;

FIG. 2A shows a basic preform with continuous longitudinal integral sidewalls and discontinuous transverse integral sidewalls to form rectangular cells, according to one embodiment of the invention. FIG. 2B shows a basic preform with continuous longitudinal integral sidewalls and discontinuous transverse integral sidewalls to form rectangular cells, according to an alternative embodiment of the invention;

FIG. 4A shows a side view of a basic preform comprising 4 layers of woven fabric. FIG. 4B. shows how fibers of the topmost layer interweave with fibers of the third layer to form an interwoven region. FIG. 4C depicts how cuts are made in the topmost layer such that separated portions of the topmost layer are created. FIG. 4D shows how the separated portions of the topmost layer can be folded at the interwoven region to form the integral sidewalls;

FIG. 5A shows a side view of a basic preform comprising 4 layers of woven fabric. FIG. 5B. shows how cuts are made in the topmost layer such that separated portions of the topmost layer are created. FIG. 5C shows how the separated portions of the topmost layer can be folded to form the non-integral sidewalls;

FIG. 6A shows an overhead view of a basic preform having interwoven regions between fibers in the warp and weft directions, and how the topmost layer is cut to form separated portions. FIG. 6B. shows how the separated portions are folded to form the longitudinal integral sidewalls, and how the second layer is cut to form separated portions. FIG. 6C shows how the separated portions of the topmost layer can be folded to form the transverse integral sidewalls;

FIG. 7A shows an overhead view of a basic preform having interwoven regions between fibers in the warp and weft directions, and how the topmost layer is cut to form separated portions. FIG. 7B shows how the separated portions are folded to form the longitudinal integral sidewalls, and how the second layer is cut to form separated portions. FIG. 7C shows how the separated portions of the topmost layer can be folded to form the transverse integral sidewalls;

FIG. 8A shows an overhead view of a basic preform having interwoven regions between fibers in the warp direction, and how the topmost layer is cut to form separated portions. FIG. 8B. shows how the separated portions are folded to form the transverse integral and non-integral sidewalls. FIG. 8C shows how the non-integral sidewalls are moved and joined with the integral sidewalls in order to form the hexagonal cell.

DETAILED DESCRIPTION

Figure 1A:
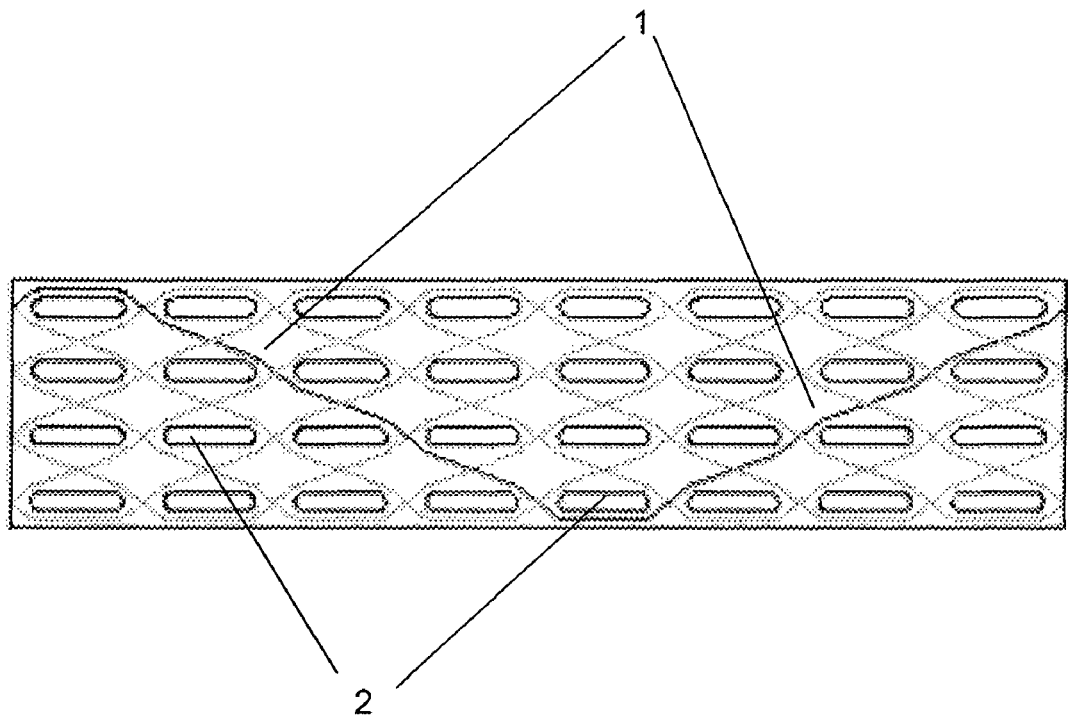
FIGS. 1A-1C depict different weave patterns of the preform.

In the following description, like reference characters designate like or corresponding parts throughout the figures. Additionally, in the following description, it is understood that such terms as "front," "back," "left," "right," "transverse," "longitudinal," and the like are words of convenience and are not to be construed as limiting terms. Furthermore, the terms "fibers" and "yarns" are used interchangeably throughout and have an equivalent meaning. Likewise, the terms "transverse" and "perpendicular" are used interchangeably throughout and have an equivalent meaning.

The present invention relates to a three-dimensional preform with sidewalls, or at least one sidewall, provided in at least one direction. The sidewalls may be an integral part of the preform, such that fibers interweave between the preform base, or substrate, and the sidewalls to lock the components together. This advantageously produces a much higher strength joint than previous methods because there is no longer a weak bond line between the components, which eliminates the potential for delamination and improves damage tolerance. The preform is constructed from one piece of material, thus eliminating all of the time associated with cutting plies for the laminated skin and sidewalls. Further, there is not a need for a tackifier, which also saves time and cost, and eliminates the potential for compatibility problems with the primary resin. The preform is first woven as a flat preform in the form of a base fabric. The base fabric is then folded into a three-dimensional preform with a substrate portion having sidewalls in at least one direction, e.g., transverse or longitudinal, but alternatively in more than one direction, e.g., transverse and longitudinal sidewalls. The resulting woven preform can be processed into a composite component with the introduction of a matrix material using conventional techniques such as resin transfer molding or chemical vapor infiltration.

The preforms can be used in various applications that are known in the art, such as for structural components that require a material which is lightweight, strong, tough, thermally resistant, self-supporting and having an adaptability to being formed and shaped. Similarly, the preform can be used in applications and the sidewalls can be used as conventional stiffeners in stiffened skin applications, with the substrate portion acting as the skin.

Figure 1B:
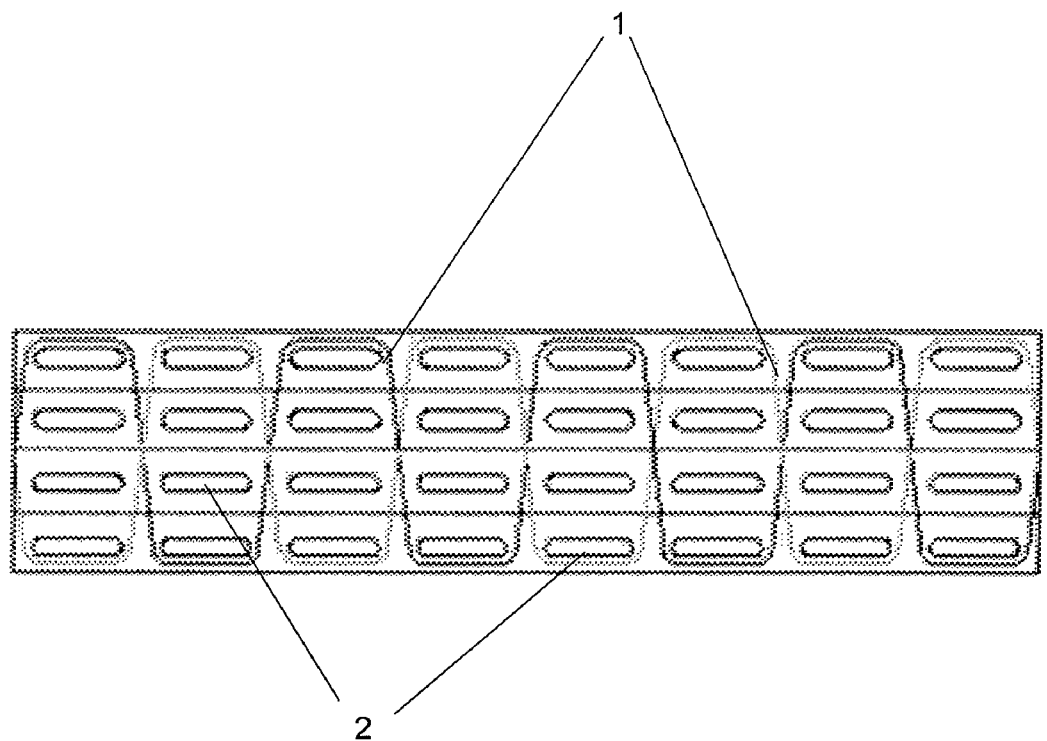
Figure 1C:
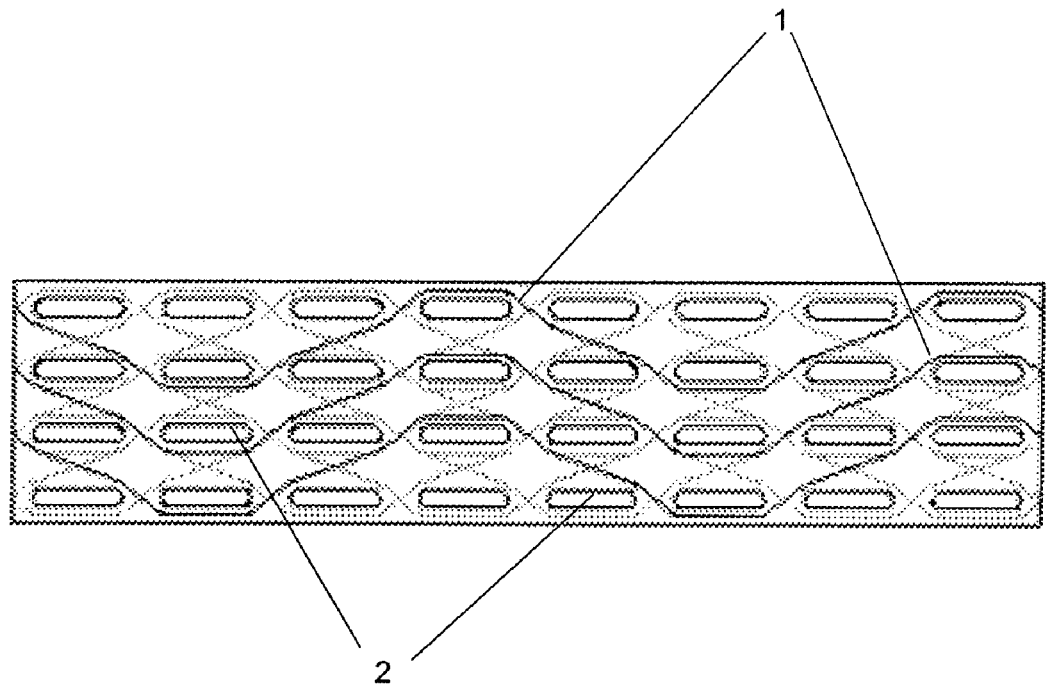

The preform may be woven with warp fibers or yarns and weft or fill fibers or yarns using a Jacquard loom or a harness loom and captured shuttle; however, any conventionally known weaving technique may be used to weave the preform. The preform can comprise any fiber that can be machine woven and may be synthetic or natural materials such as carbon, nylon, rayon, polyester, fiberglass, cotton, glass, ceramic, aramid and polyethylene. The fibers can be woven into layers, wherein each of the layers of the preform can have any weave pattern such as plain, twill, satin, and between the layers ply-to-ply, orthogonal, or angle interlock. For example, in a through thickness angle interlock architecture as depicted in FIG. 1A, warp fibers 1 pass through the full thickness of the preform at an angle that is defined by the pick or spacing of the weft fibers 2. In a through thickness orthogonal architecture as shown in FIG. 1B, warp fibers 1 pass through the full thickness of the preform between adjacent pick or columns of weft fibers 2, so the through thickness component is more or less orthogonal to the faces of the fabric. This type of architecture usually includes warp 'stuffers' that simply pass between two layers of picks without weaving. In a ply-to-ply interlock architecture as shown in FIG. 1C, warp fibers 1 only pass part way through the full thickness of the preform, locking two or more layers together. The warps usually have an interlock angle similar to angle interlock architectures, but can be orthogonal also. For instance, layer 1 in the preform can be locked to layer 2, layer 2 to layer 3, and so on.

Figure 2A:
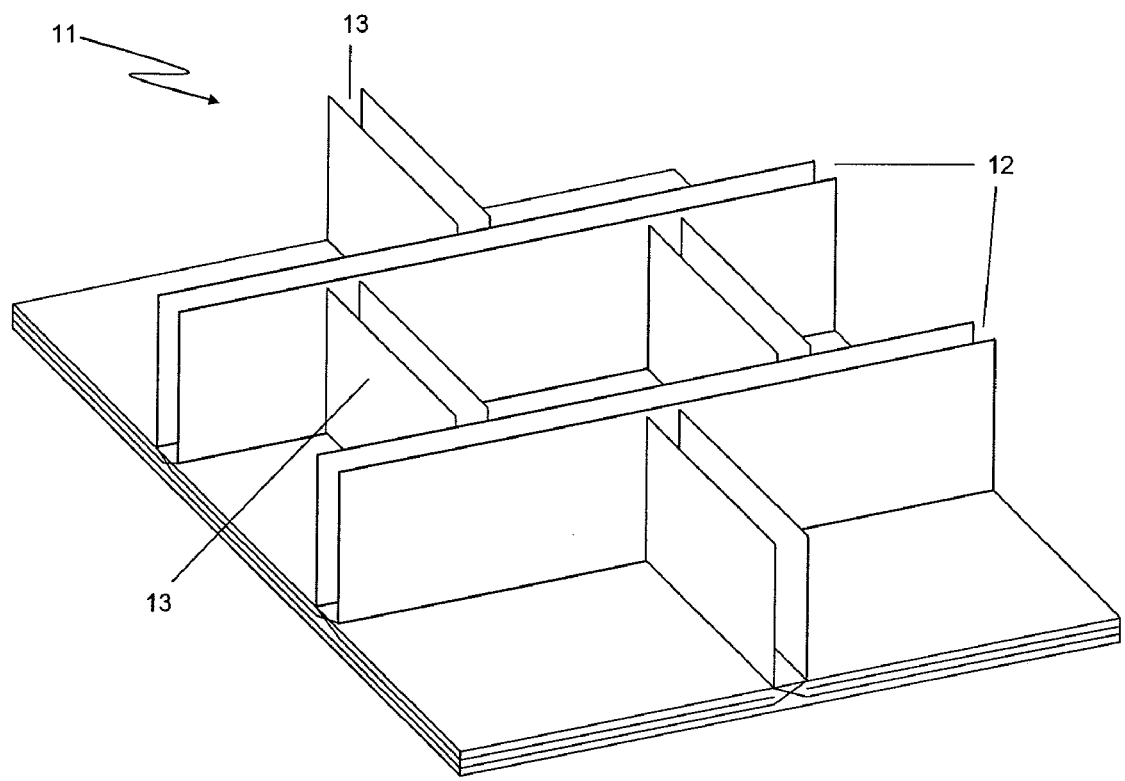
FIGS. 2A-2B show basic preforms with integral sidewalls.

According to one embodiment of the invention, the invention comprises a three-dimensional preform with one or more integral sidewalls in the longitudinal and transverse directions, wherein sidewalls form rectangular cells as depicted in FIG. 2A. This preform originally comprised six layers of woven fabric, wherein the top layer forms two rows of continuous integral sidewalls 12 in the longitudinal (warp) direction and the second layer forms four rows of discontinuous integral sidewalls 13 in the transverse (weft) direction; thus preform 11 as shown comprises the continuous integral sidewalls 12, the discontinuous integral sidewalls 13, and the substrate comprising the remaining four layers.

Figure 2B:
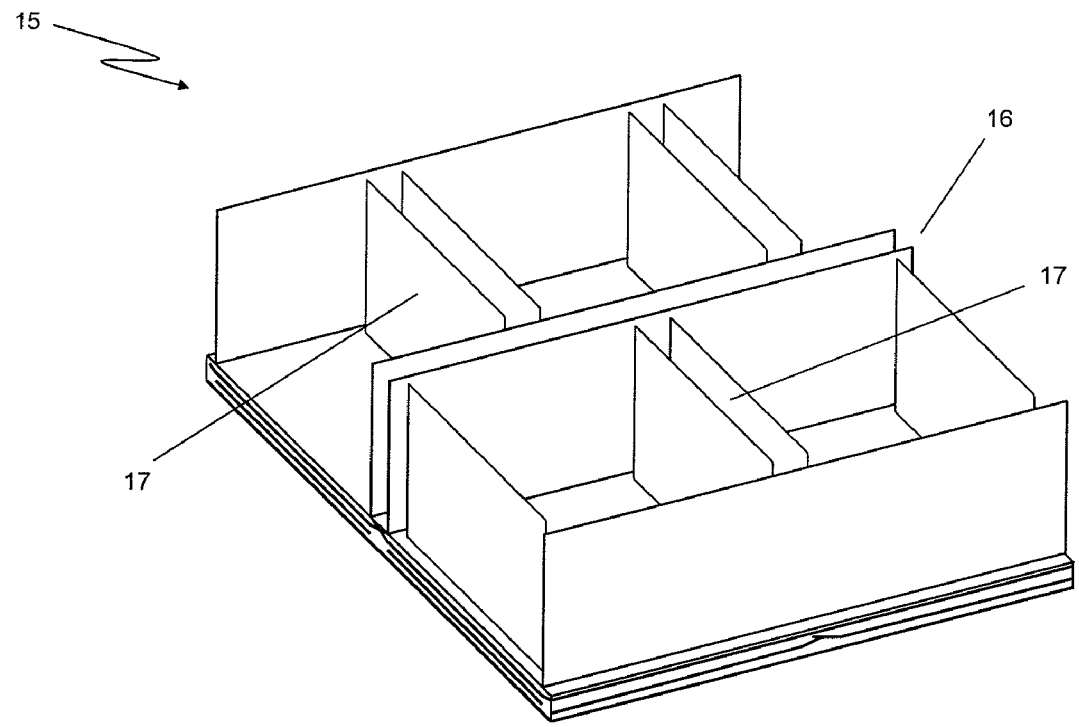

In an alternative embodiment depicted in FIG. 2B, the preform originally comprised six layers of woven fabric wherein the top layer forms three rows of continuous integral sidewalls 16 in the longitudinal (warp) direction and the second layer forms five rows of discontinuous integral sidewalls 17 in the transverse direction. As a result, preform 15 as shown comprises the continuous integral sidewalls 16, the discontinuous integral sidewalls 17, and the substrate comprising the remaining four layers.

Figure 3:
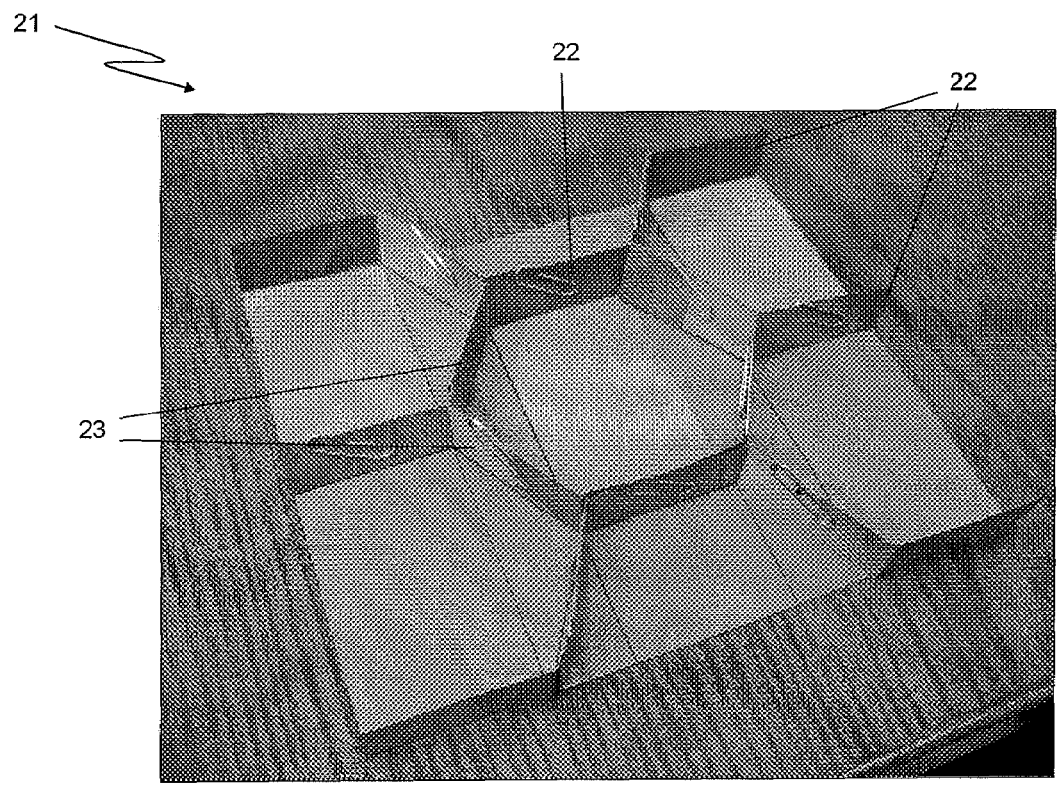
FIG. 3 shows a basic preform with discontinuous transverse integral sidewalls and discontinuous non-integral sidewalls which are used to form hexagonal cells, according to one embodiment of the invention.

Hence, variations of the embodiments depicted in FIGS. 2A and 2B can include:
- the number of layers forming the preform, which is preferably three or greater
- the number of continuous or discontinuous sidewalls
- the direction of the continuous and discontinuous sidewalls, i.e., longitudinal or transverse
- the layers that are interwoven
- the presence of continuous non-integral sidewalls
- the presence of discontinuous non-integral sidewalls
- the presence of both continuous and discontinuous non-integral sidewalls
- the location of the longitudinal and transverse sidewalls According to another embodiment, the invention comprises a three-dimensional preform with integral sidewalls in the longitudinal direction, and non-integral sidewalls in the diagonal directions, wherein the sidewalls form a hexagonal cell as shown in FIG. 3. This preform 21 originally comprised two layers of woven fabric, wherein the top layer forms five rows of discontinuous integral sidewalls 22 in the longitudinal (warp) direction and four rows of discontinuous non-integral sidewalls 23 in the diagonal direction between the longitudinal and transverse directions. Therefore, the substrate of preform 21 comprises one layer of fabric. The diagonal sidewalls are moved and secured with the longitudinal sidewalls to create the hexagonal cell. The sidewalls run in the 0°, +60°, and −60° directions, which is advantageous in applications wherein the sidewalls are used as stiffeners. This design is considered as a quasi-isotropic configuration, since the in-plane stiffness would be equal regardless of which direction force is applied.

Variations of the embodiment depicted in FIG. 3 can include:
- the number of layers forming the preform, which is preferably two or greater
- the shape of the cell, which can include any polygonal shape
- the number of discontinuous integral sidewalls
- the direction of the discontinuous integral sidewalls, i.e., warp or weft
- the presence of continuous integral sidewalls
- the number of discontinuous non-integral sidewalls
- the presence of continuous non-integral sidewalls
- the orientation of the non-integral sidewalls Of course, the invention can also comprise a combination of the preforms depicted in FIGS. 1A-1C, 2A-2B, and 3, e.g., and may comprise continuous and discontinuous integral sidewalls, combined with non-integral sidewalls to form various shapes such as rectangles and squares and hexagons of differing sizes.

Figure 4A:
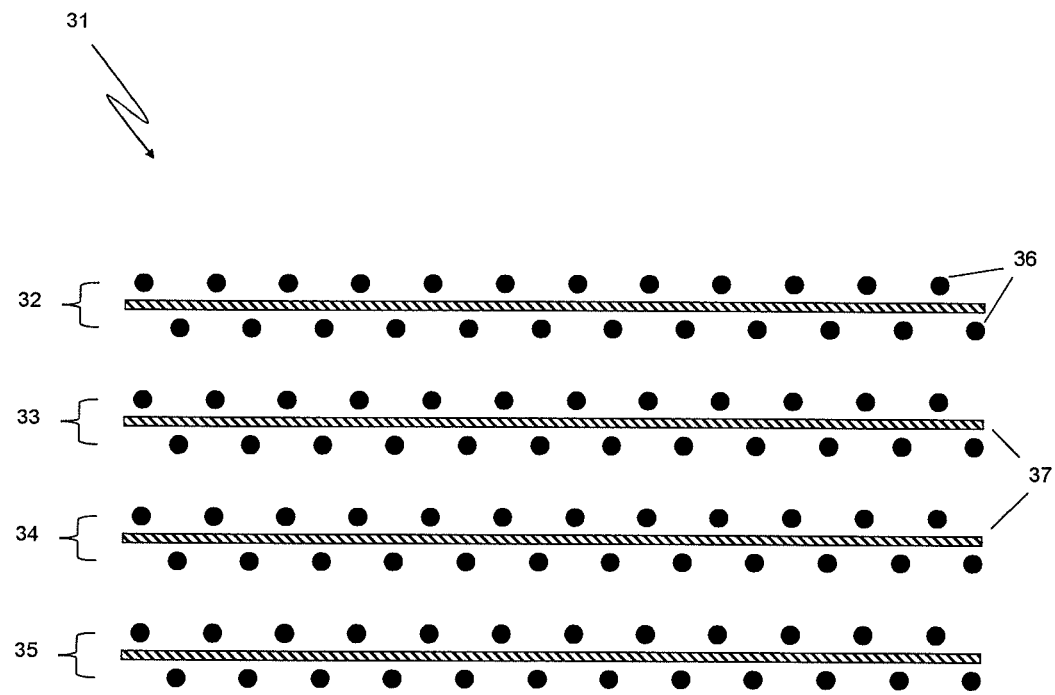
FIGS. 4A-4D depict the formation of integral sidewalls.
Figure 4B:
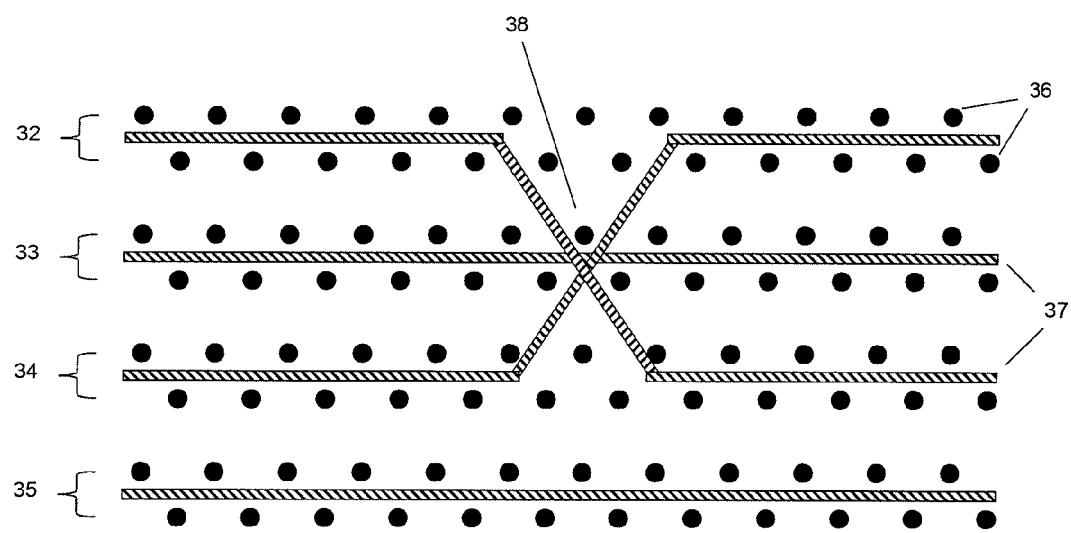
Figure 4C:
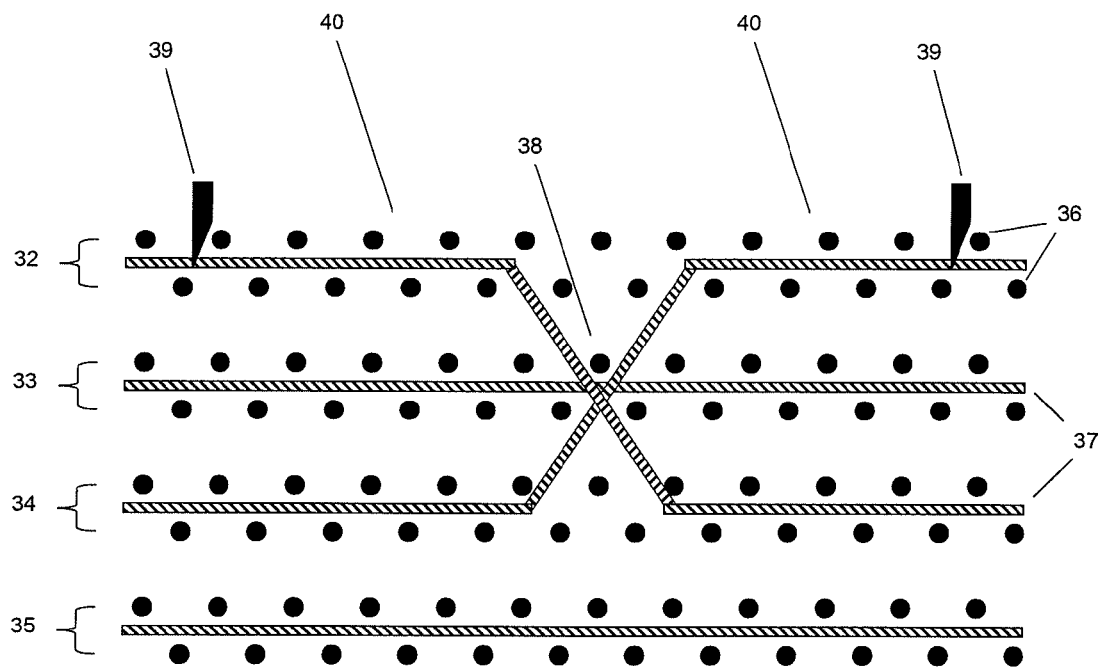
Figure 4D:
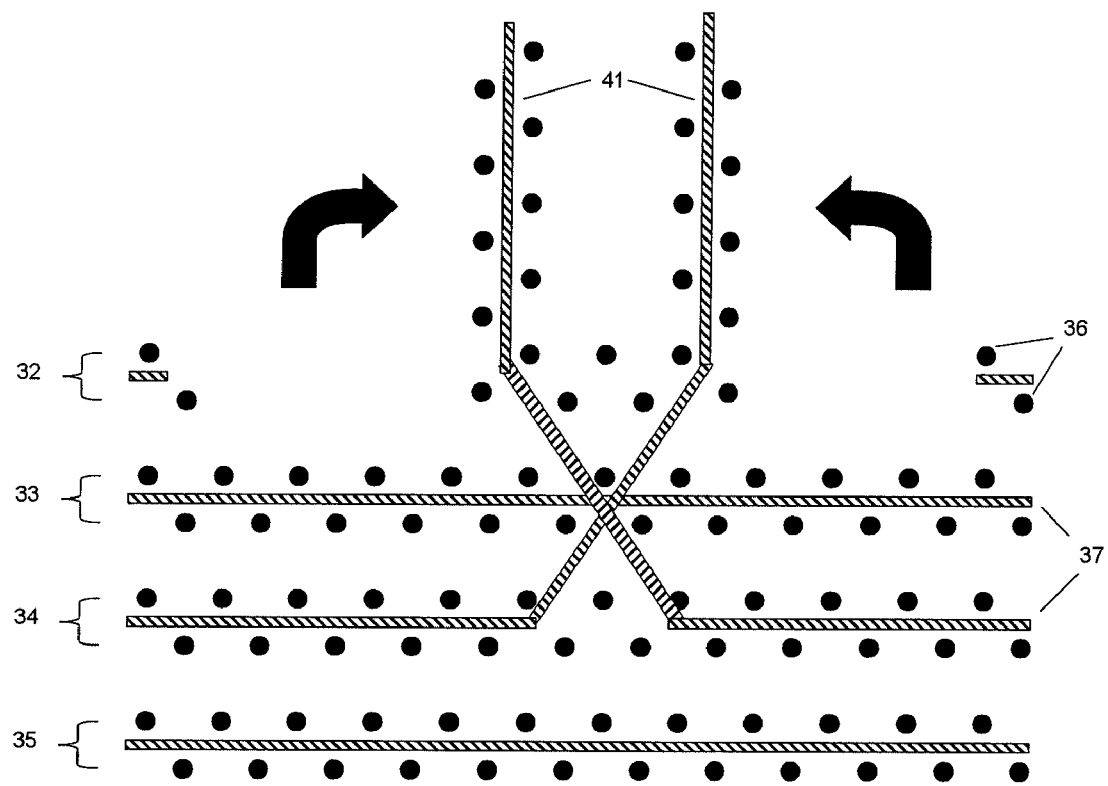

As described above, the fold is located at sites where the yarns are interwoven between layers to form interwoven regions. Sidewalls in the weft direction are formed from fibers in the warp direction interweaving between layers, while sidewalls in the warp direction are formed from fibers in the weft direction. For example, FIG. 4A shows a cross-section of a preform 31 comprising four layers of fabric (32, 33, 34, and 35). Circles represent fibers in the warp direction 36 (toward the viewer), while the striated lines represent fibers in the weft direction 37. FIG. 4B shows weft fibers of the top layer interweave with fibers in the third layer. The site of interweaving forms interwoven region 38 which marks where the topmost layer will be folded to form the integral sidewall. FIG. 4C shows that the topmost layer has to be cut 39 in order to form separated portions 40 of the layer that can be folded upwards to form the sidewall. FIG. 4D shows the folding of the separated portion of the topmost layer and the formation of integral sidewalls 41. The sidewalls are integrated with at least one the other layers of the preform, namely the third layer 34.

Figure 5A:
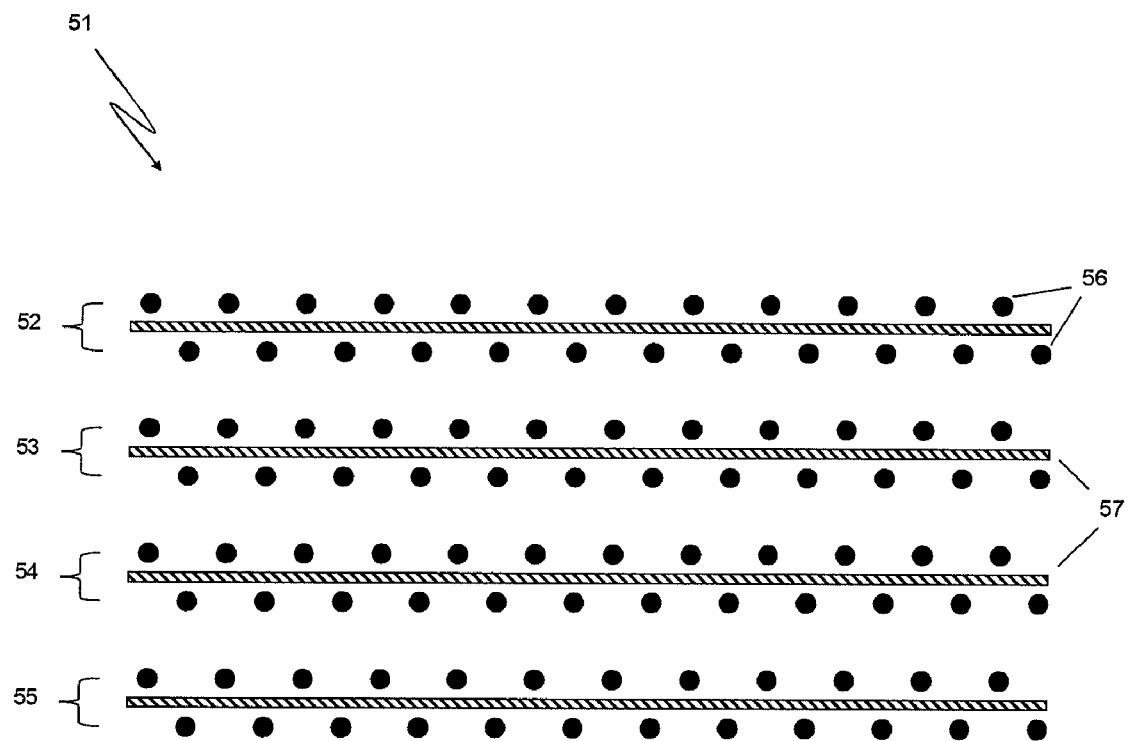
FIGS. 5A-5C depict the formation of non-integral sidewalls.
Figure 5B:
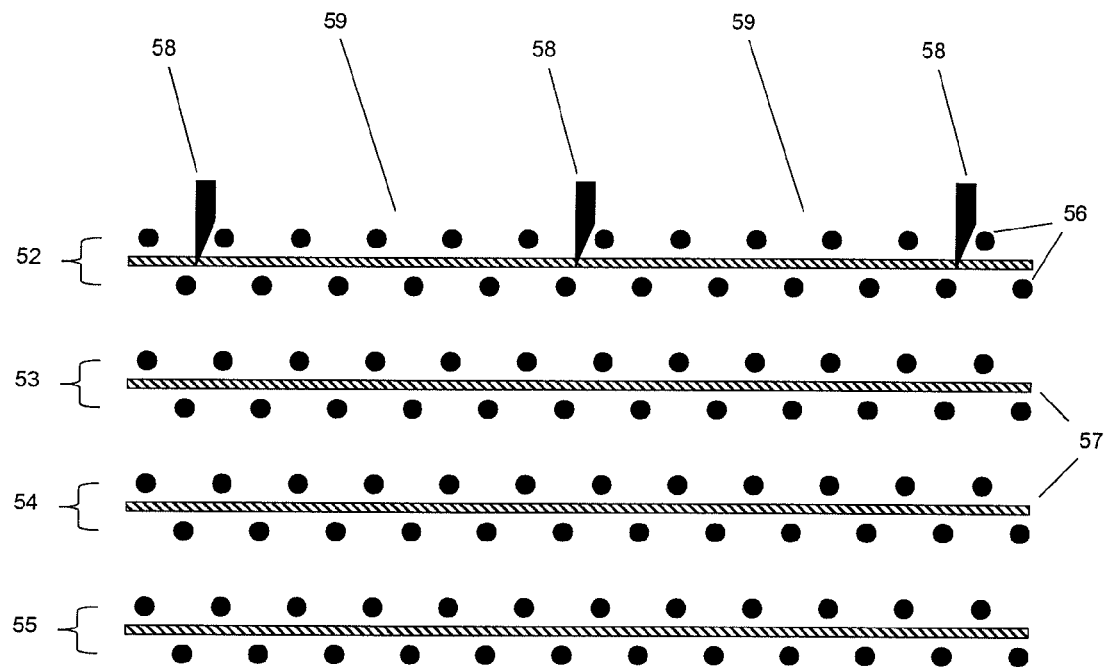
Figure 5C:
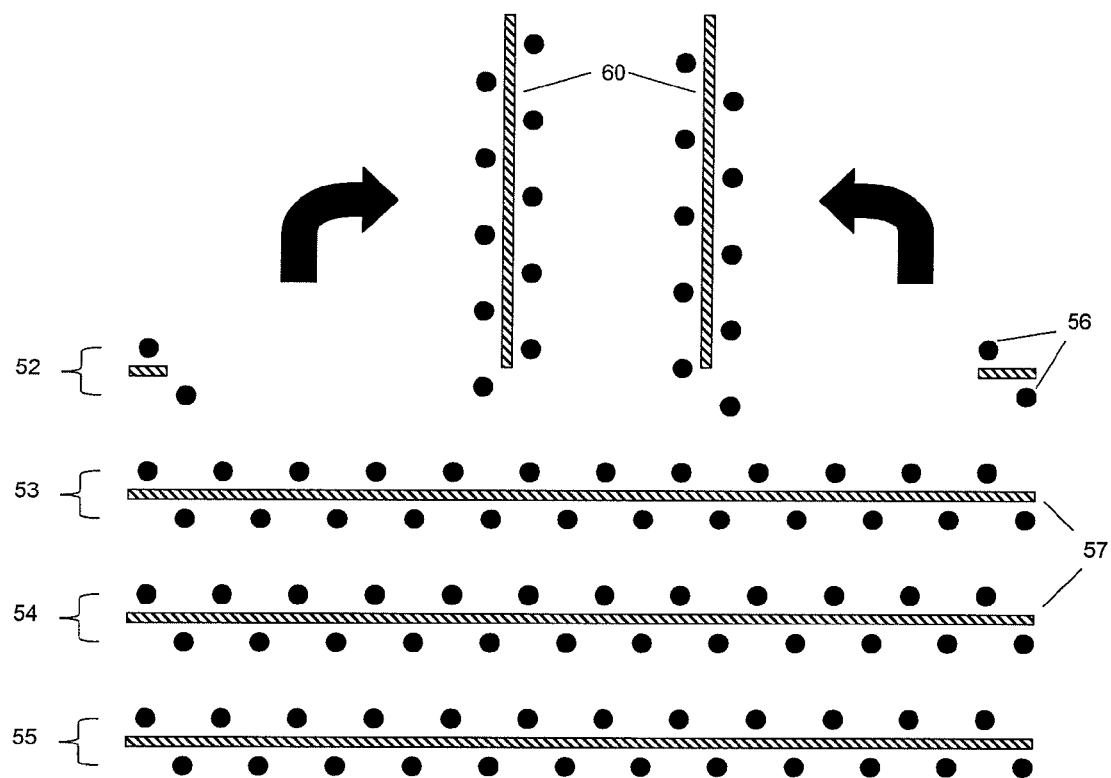

Sidewalls can also be formed which are not integrated with the preform. FIG. 5A depicts a cross-section of a preform 51 comprising four layers of fabric (52, 53, 54, and 55). Circles represent fibers in the warp direction 56 (toward the viewer), while the striated lines represent fibers in the weft direction 57. As shown in FIG. 5B, cuts 58 are made in the topmost layer in order to form separated portions 59 of the layer that can be folded upwards. FIG. 5C shows the folding of the separated portion of the topmost layer and the formation of sidewalls 60 which are not integrated with the preform and can therefore be moved.

In various embodiments, the preform may consist of integral sidewalls comprising two pieces of material that are integrally woven with the substrate. Additional material can be placed between the two woven pieces to increase the thickness of the sidewall or to include reinforcement in directions other than those provided by the weaving process. For example, fabric may be cut on the bias could be placed between the woven portions of the sidewall to produce a sidewall that has 0° and 90° reinforcement (from the integrally woven portions) and ±45° reinforcement (from the bias fabric). The bias layers fabric can be woven using warp and weft fibers or yarns or they can be nonwoven, knitted or an unwoven array of fibers or yarns. The yarns in the array are parallel to each other. The can array can be oriented from 0° to 90° as compared to the orientation of the sidewall. Like the preform, the bias fabric can comprise any fiber that can be machine woven and may be synthetic or natural materials such as carbon, nylon, rayon, polyester, fiberglass, cotton, glass, ceramic, aramid, and polyethylene. The fibers in the fabric can follow any weave pattern such as plain, twill, satin, and between layers ply-to-ply, orthogonal, or angle interlock.

Techniques known in the art can be applied to maintaining the sidewall laminate together. Such techniques include stitching, T-forming (e.g., see U.S. Pat. No. 6,103,337, which is incorporated herein by reference), etc.

The present invention also relates to a method of forming a woven three-dimensional preform with sidewalls. The method comprises providing two or more layers of woven fabric wherein a plurality of fibers from one layer of fabric are interwoven with a plurality of fibers from another layer of fabric. There can be multiple pairs of interwoven layers. The sidewalls are then formed by cutting and then folding portions of the layers of the preform, starting with the topmost layer. The cutting and folding can then be repeated for additional layers.

The sidewalls can consist of one or more layers of fabric. Sidewalls consisting of one layer of fabric can be formed by cutting and folding portions of the topmost layer upward (e.g., see FIGS. 7B and 7C). If the fold occurs at an interwoven region, then the resulting single-layered sidewall is an integral sidewall; otherwise, the sidewall is non-integral. Sidewalls consisting of two layers of fabric can be formed by cutting and folding two adjacent portions of the topmost layer together. Again, if the fold occurs at an interwoven region, the resulting double-layered sidewalls are integrated into the substrate of the preform; if not, the sidewalls are not integrated into the substrate. Sidewalls of more than two layers can be formed by moving non-integral sidewalls together.

The substrate will usually be of multilayer construction. Alternatively, the preform may be a hybrid construction, and comprise more than one material such as a mixture of glass and carbon yarn sidewalls.

Figure 6A:
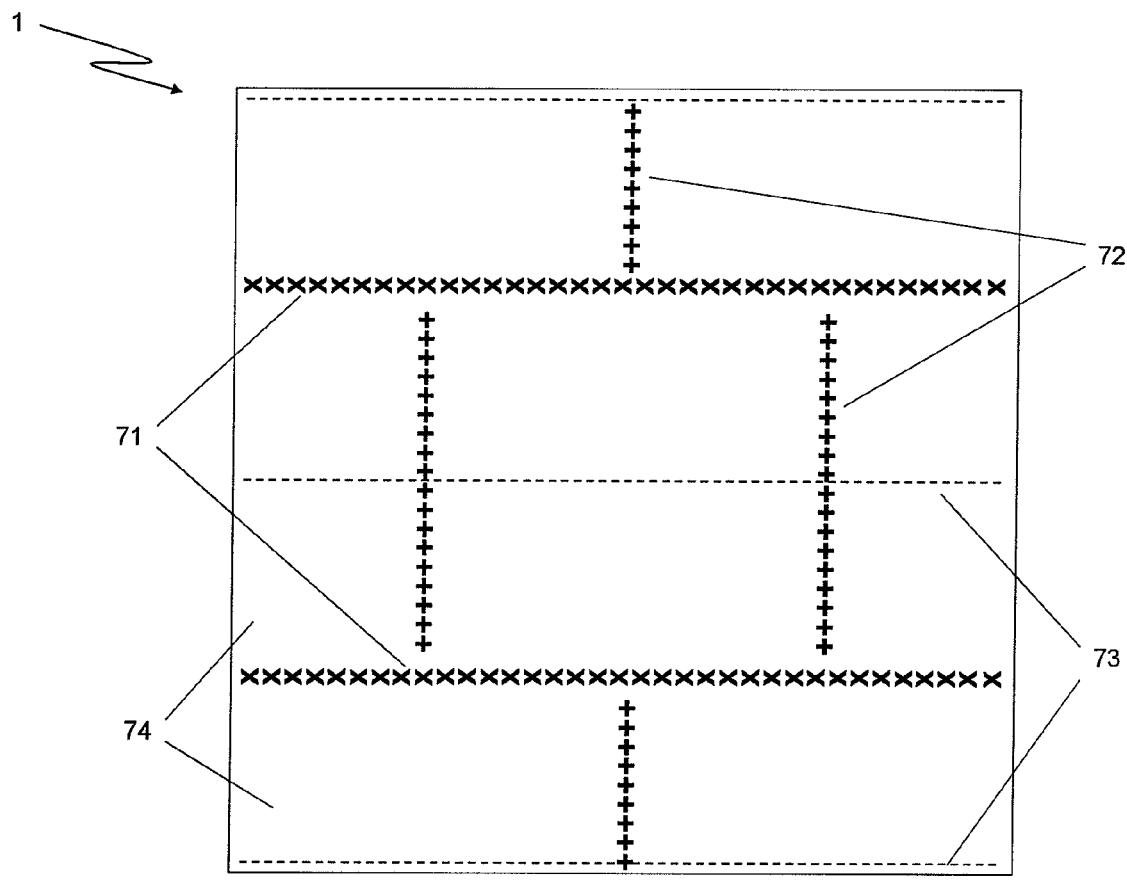
FIGS. 6A-6C depict the formation of a basic preform with continuous longitudinal integral sidewalls and discontinuous transverse integral sidewalls to form rectangular cells, according to one embodiment of the invention.
Figure 6B:
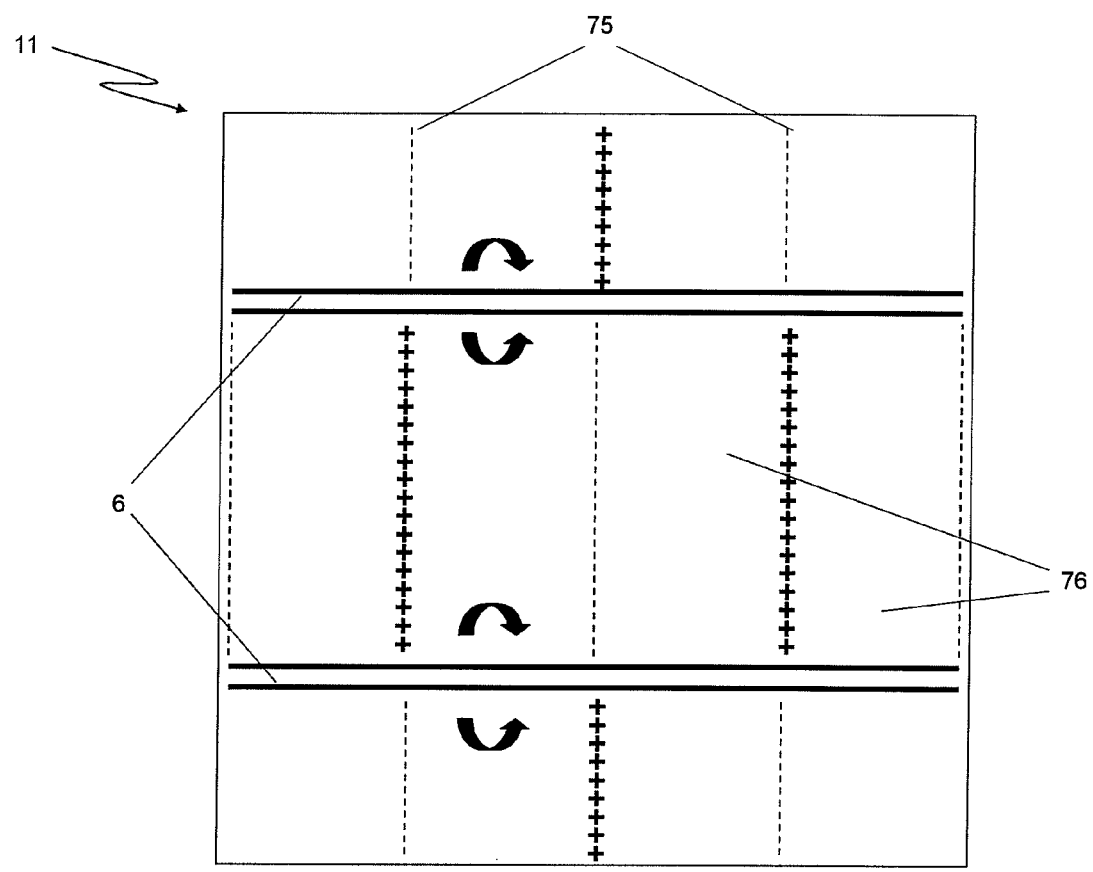
Figure 6C:
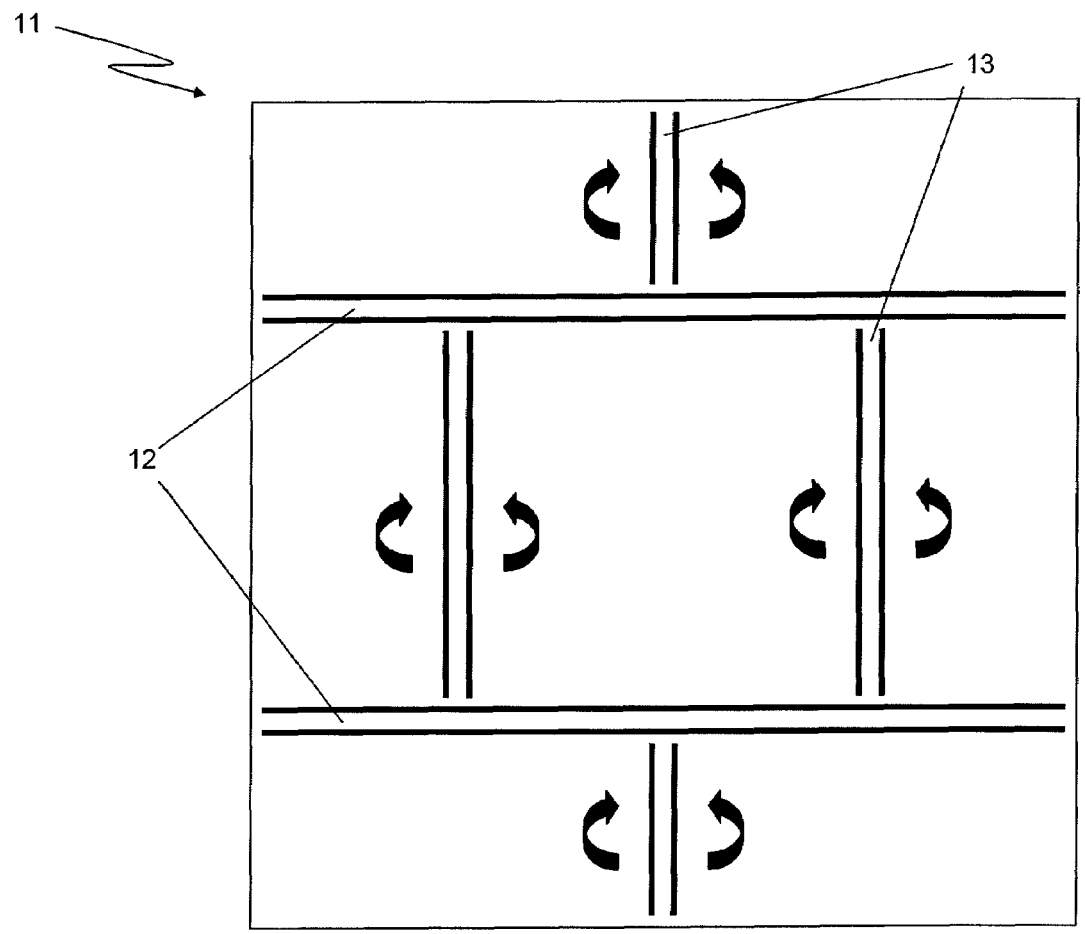

As an example, FIG. 6A-6C shows how the preform is interwoven and how the sidewalls are formed for the embodiment depicted in FIG. 2A. FIG. 6A shows an overhead view of the woven preform before the sidewalls are formed. The fibers are interwoven between the first and third layers in the weft direction (indicated by "×") at interwoven region 71 and in the warp direction between the second and third layers (marked by "+") at interwoven region 72. To form the preform 11, longitudinal cuts 73 are made in the topmost layer (indicated by dotted lines) to form separated portions 74 that can be lifted and folded. FIG. 6B shows that the longitudinal cuts enable the separated portions of the layer to be folded so that longitudinal sidewalls 12 are formed. These sidewalls are integrated with the preform, since the folding occurs at the same interwoven region 71 that the layers are interwoven. Transverse cuts 75 are now made in the now topmost layer to form separated portions 76 so that this layer can be lifted and folded. FIG. 6C shows that the transverse cuts enable the separated portion of the topmost layer to be folded so that transverse sidewalls 13 can be formed. The resulting preform 11 is the same as the embodiment shown in FIG. 2A. Importantly, the preform depicted in FIGS. 6A-6C may comprise only a small portion of a larger preform, wherein the pattern of interweaving between layers and forming the sidewalls is repeated in the warp and weft directions.

Figure 7A:
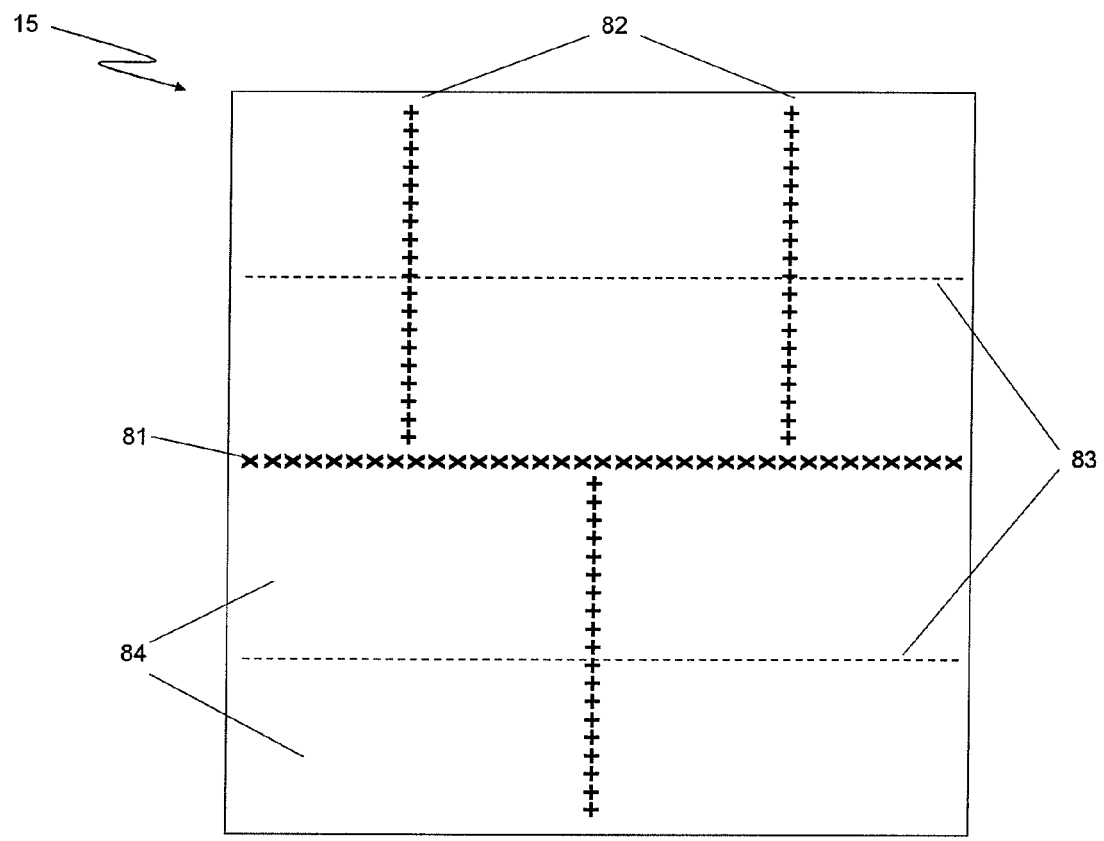
FIGS. 7A-7C depict the formation of a basic preform with continuous longitudinal integral sidewalls and discontinuous transverse integral sidewalls to form rectangular cells, according to an alternative embodiment of the invention.
Figure 7B:
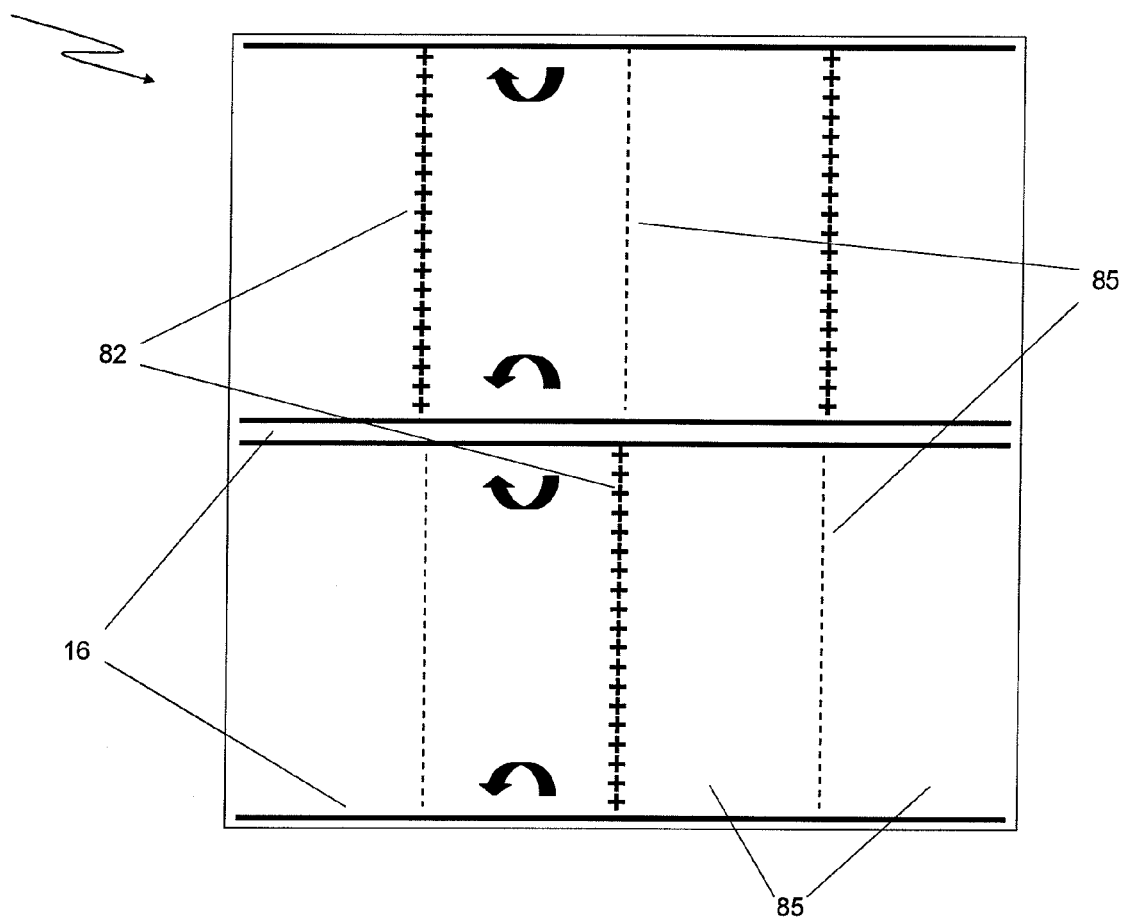
Figure 7C:
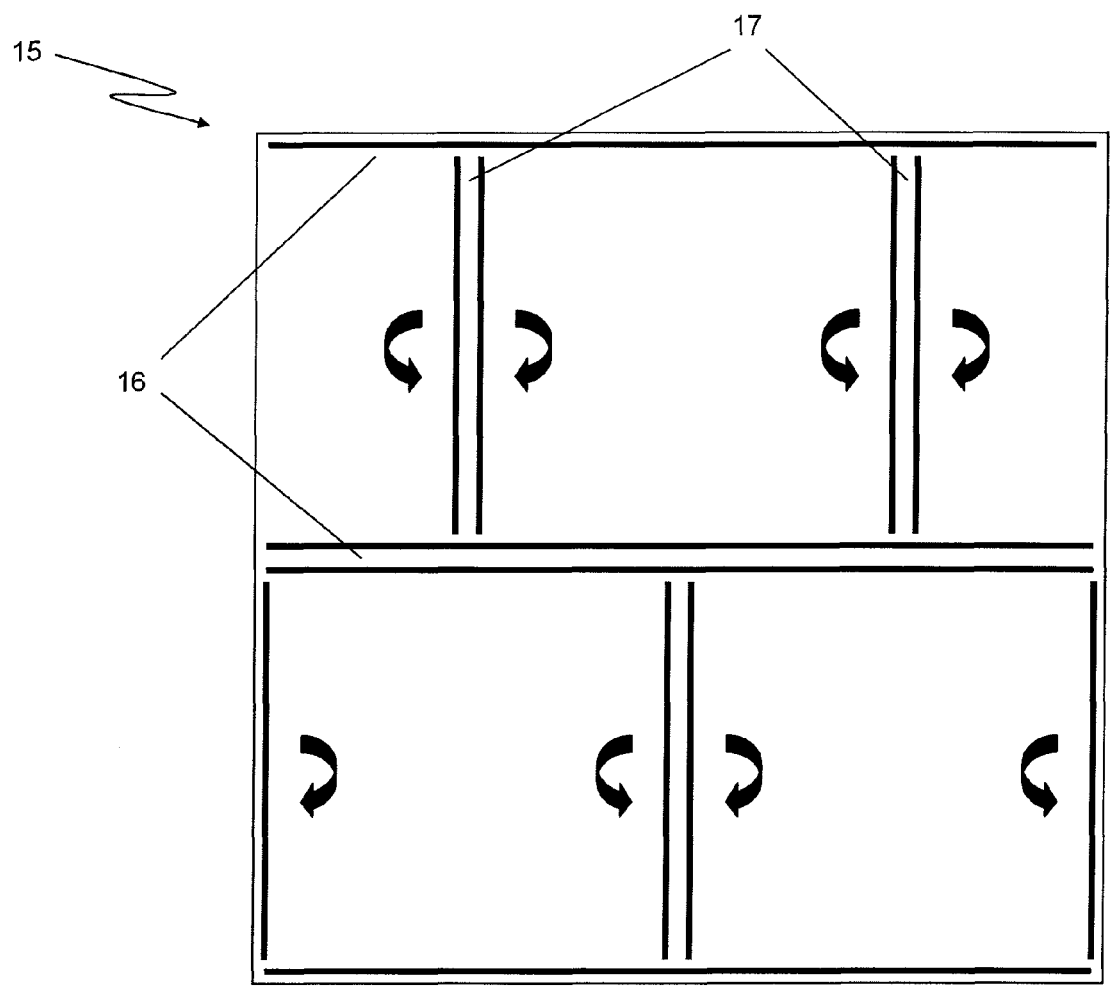

FIG. 7A-7C shows how the preform is interwoven and how the sidewalls are formed for the embodiment depicted in FIG. 2B. FIG. 7A shows an overhead view of preform 15 before the sidewalls are formed. The fibers are interwoven between the first and third layers in the weft direction (marked by "×") at interwoven region 81 and in the warp direction (marked by "+") between the second and third layers at interwoven region 82. Longitudinal cuts 83 are made in the topmost layer to form separated portions 84 which can be folded. FIG. 7B shows that the separated portions of the topmost layer are folded to form the longitudinal sidewalls 16, which are integrated with the preform. Transverse cuts 85 are now made in the now topmost layer to form separated portions 86 which can be lifted and folded. FIG. 7C shows that the transverse cuts enable the topmost layer to be folded so that transverse sidewalls 17 can be formed. The resulting preform 15 is the same as the embodiment shown in FIG. 2B. Notably, the preform depicted in FIGS. 7A-7C may represent only a small portion of a larger preform, wherein the pattern of interweaving between layers and forming the sidewalls is repeated in the warp and weft directions.

Figure 8A:
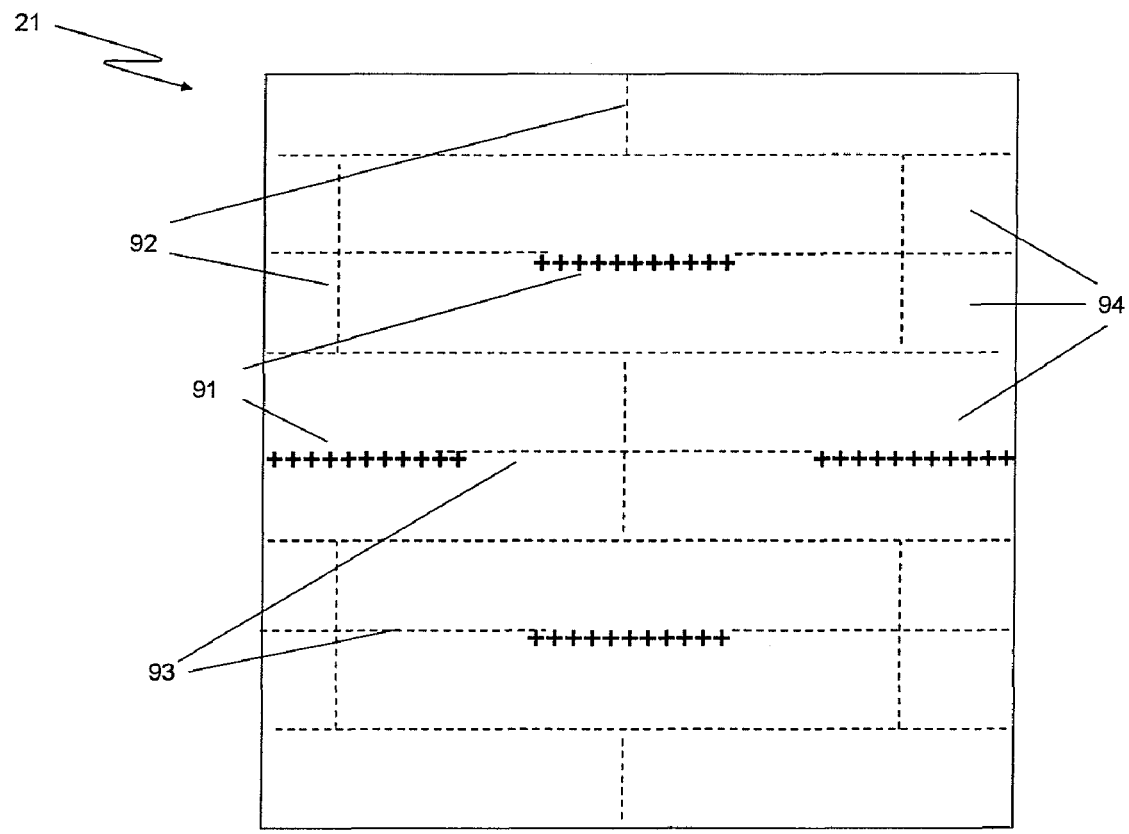
FIGS. 8A-8C depict the formation of a basic preform with discontinuous transverse integral sidewalls and discontinuous non-integral sidewalls which are used to form hexagonal cells, according to one embodiment of the invention.
Figure 8B:
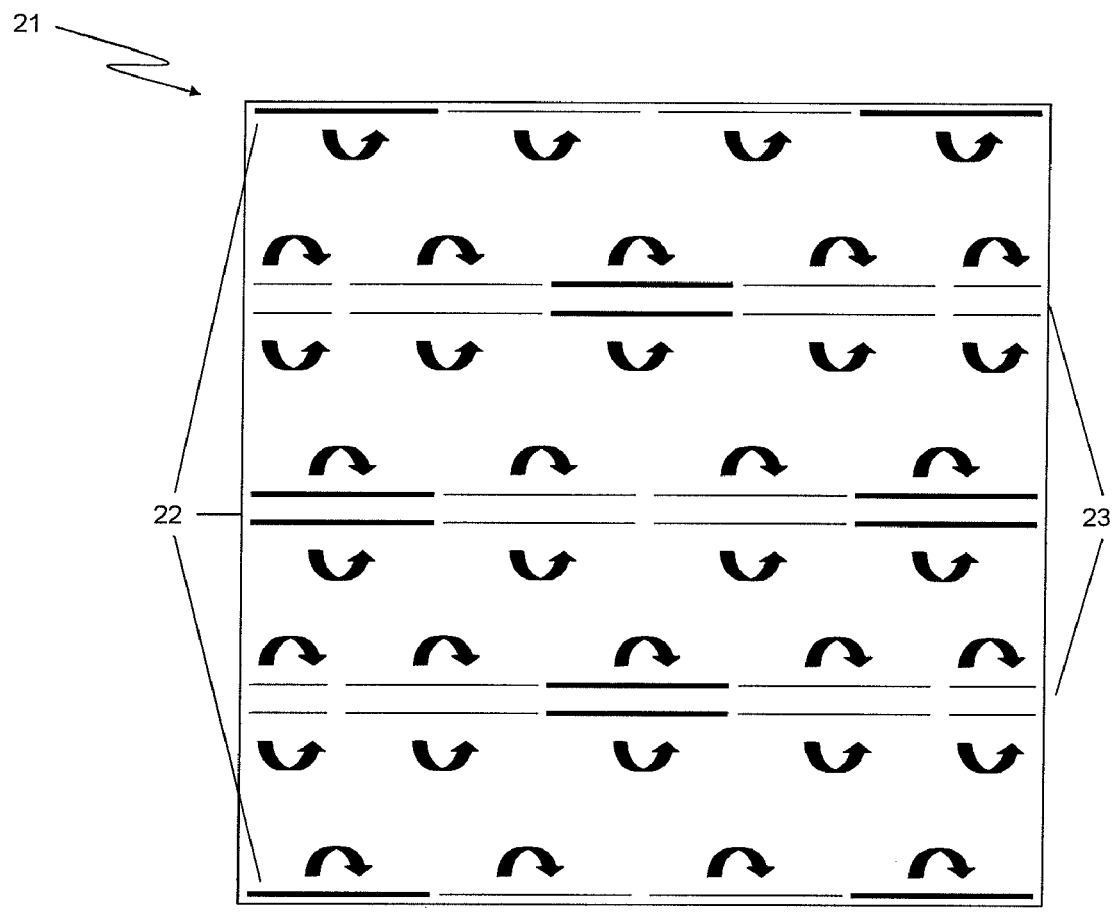
Figure 8C:
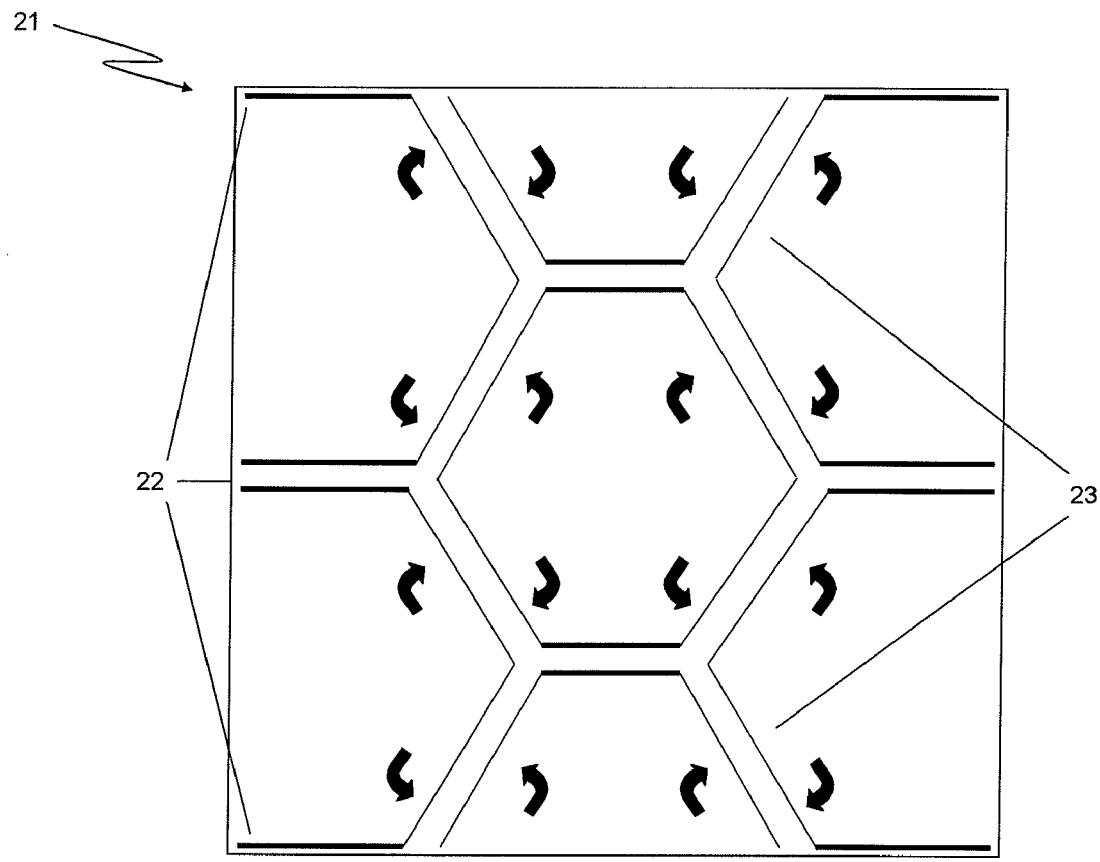

As a further example, FIGS. 8A-8C shows how the preform 21 is interwoven for the embodiment depicted in FIG. 3. FIG. 8A shows an overhead view of preform 21 before the sidewalls are formed. The fibers are interwoven the warp direction (marked by "+") between the first and second layers at sites 91. Longitudinal 92 and transverse cuts 93, marked by the dotted lines, are made in the topmost layer to form separated portions 94 at the sites indicated in FIG. 8A. FIG. 8B shows that the topmost layer is folded to form the transverse sidewalls. The sidewalls formed at the sites where the top and second layers are interwoven will form integral sidewalls 22 (also marked by bolder lines), while the sidewalls formed at the sites where the layers are not interwoven will be non-integral sidewalls 23. It is important to note that the FIGS. 8A-8C represent only a small region of the entire preform, and that the pattern of interweaving the layers is repeated in the warp and weft direction. Hence, FIG. 8B shows that the sidewalls in the corners are integral. FIG. 8C depicts how the non-integral sidewalls can be moved to join the integral sidewalls and form the hexagonal cell. The non-integral sidewalls can be jointed to the integral sidewalls by methods known in the art such as T-forming, tufting, and stitching.

After the base fabric is folded into an integrally woven three-dimensional preform with sidewalls, the composite stiffened panel or component can now be formed with the introduction of a matrix material such as epoxy, polyester, vinyl-ester, ceramic, carbon and/or other materials, which also exhibit desired physical, thermal, chemical and/or other properties, using convectional techniques such as resin transfer molding or chemical vapor infiltration.

Accordingly, it has been shown that a base fabric can be designed and shaped into a three dimensional woven preform with integral sidewalls in at least one directions.

Although a preferred embodiment of the present invention and modifications thereof have been described in detail herein, it is to be understood that this invention is not limited to this precise embodiment and modifications, and that other modifications and variations may be effected by one skilled in the art without departing from the spirit and scope of the invention as defined by the appended claims.

What is claimed is:

1. An integrally woven three-dimensional preform with at least one sidewall in at least one direction constructed from a woven base fabric, the base fabric comprising three or more layers, wherein:
   (a) the at least three layers comprise at least a top layer, a second layer that is below the top layer, and a third layer that is below the second layer;
   (b) the layers comprise fibers in a first direction and fibers in a second direction perpendicular to the first direction;
   (c) there are a plurality of first interwoven regions, wherein each first interwoven region comprises fibers of the top layer in the first direction interwoven with fibers of the third layer in the first direction;
   (d) there are a plurality of first integral sidewalls in the second direction, wherein each first integral sidewall is at a different first interwoven region, wherein each first integral sidewall is formed by folding portions of the exposed top layer on each side of the first interwoven region towards each other to form the first integral sidewall, wherein each first integral sidewall is perpendicular to the base fabric and interwoven with the fibers of the third layer in the first direction, and wherein folding of the top layer exposes portions of the second layer;
   (e) there are a plurality of second interwoven regions, wherein each second interwoven region comprises fibers of the second layer in the second direction interwoven with fibers of the third layer in the second direction;
   (f) there are a plurality of second integral sidewalls in the first direction, wherein each second integral sidewall is at a different second interwoven region, wherein each second integral sidewall is perpendicular to the first integral sidewalls and is formed by folding the exposed portions of the second layer on each side of the second interwoven region towards each other to form the second integral sidewall, and wherein each second integral sidewall is perpendicular to the base fabric and interwoven with the fibers of the third layer in the second direction; and
   (g) the first and second integral sidewalls form at least one cell.

2. The preform of claim 1, wherein the integral sidewalls are continuous or discontinuous across the preform.

3. The preform of claim 1, wherein the preform comprises a combination of continuous and discontinuous integral sidewalls.

4. The preform of claim 2 or 3, wherein discontinuous integral sidewalls are aligned.

5. The preform of claim 2 or 3, wherein the discontinuous integral sidewalls are staggered.

6. The preform of claim 1, wherein the sidewalls form multiple cells.

7. The preform of claim 6, wherein the multiple cells are rectangular.

8. The preform of claim 6, wherein the multiple cells are different sizes and shapes.

9. The preform of claim 1, wherein the preform further comprises non-integral sidewalls which are not formed at interwoven regions, wherein the integral sidewalls are formed by folding an adjacent portion of an exposed layer and wherein the non-integral sidewalls are continuous or discontinuous.

10. The preform of claim 9, wherein the non-integral sidewalls are formed by folding together two adjacent portions of an exposed layer.

11. The preform of claim 9, wherein the preform comprises a combination of continuous non-integral sidewalls and discontinuous non-integral sidewalls.

12. The preform of claim 9, wherein the non-integral sidewalls are joined to the integral sidewalls by a technique selected from the group consisting of stitching, T-forming, and tufting.

13. The preform of claim 12, wherein the non-integral sidewalls are at angles with respect to integral sidewalls, with respect to other non-integral sidewalls, or a combination of both.

14. The preform of claim 13, wherein the sidewalls form one or more cells.

15. The preform of claim 14, wherein the cells are polygonal in shape.

16. The preform of claim 15, wherein the polygonal shape is a hexagon.

17. The preform of claim 1, wherein the preform comprises a fiber of a synthetic or natural material.

18. The preform of claim 17, wherein the fiber is selected from the group consisting of carbon, nylon, rayon, polyester, fiberglass, cotton, glass, ceramic, aramid and polyethylene.

19. The preform of claim 1, wherein the layers comprise a fabric having a weave pattern selected from the group consisting of plain weave, twill, satin, and between layers ply-to-ply, orthogonal, or angle interlock.

20. The preform of claim 1 or 9, wherein material is placed between the portions that comprise the sidewall.

21. The preform of claim 20, wherein the material is a fabric cut on the bias.

22. The preform of claim 21, wherein the bias fabric comprises a synthetic or natural material.

23. The preform of claim 22, wherein the material is selected from the group consisting of carbon, nylon, rayon, polyester, fiberglass, cotton, glass, ceramic, aramid, and polyethylene.

24. The preform of claim 22, wherein fibers of the bias fabric can follow a weave pattern selected from the group consisting of plain, twill, satin, and between layers ply-to-ply, orthogonal, or angle interlock.

25. The preform of claim 1 or 9, wherein the portions that comprise the sidewalls are held together by a technique selected from the group consisting of stitching, T-forming, and tufting.

26. The preform of claim 20, wherein the portions that comprise the sidewalls and the material placed between said portions are held together by a technique selected from the group consisting of stitching, T-forming, and tufting.

* * * * *